United States Patent [19]

Takano et al.

[11] Patent Number: 5,005,685

[45] Date of Patent: Apr. 9, 1991

[54] TORQUE TRANSMITTING DEVICE

[75] Inventors: Masami Takano; Tetsurou Hamada; Katsuhiko Masuda, all of Tochigi, Japan

[73] Assignee: Honda Giken Kogyo Kabushiki Kaisha, Tokyo, Japan

[21] Appl. No.: 212,711

[22] Filed: Jun. 28, 1988

[30] Foreign Application Priority Data

Jun. 30, 1987 [JP] Japan ................. 62-162622

[51] Int. Cl.$^5$ ................. F16D 31/00; F16D 13/64
[52] U.S. Cl. .................. 192/58 B; 192/70.2
[58] Field of Search ............. 192/58 B, 70.2; 180/248; 74/650

[56] References Cited

FOREIGN PATENT DOCUMENTS

| 0223442 | 5/1987 | European Pat. Off. | ......... 192/106.1 |
| 0204320 | 12/1982 | Japan | ................. 192/106.1 |
| 1551009 | 8/1979 | United Kingdom . | |
| 2199121 | 6/1988 | United Kingdom | ............. 192/58 B |

Primary Examiner—Rodney H. Bonck
Assistant Examiner—Andrea Pitts
Attorney, Agent, or Firm—Ladas & Parry

[57] ABSTRACT

A torque transmitting device includes a rotatable case having defined therein a fluid chamber extending axially and filled with a fluid, a rotatable shaft disposed coaxially in the fluid chamber and rotatable with respect to the case, a plurality of outer plates and inner plates disposed coaxially in the fluid chamber for relative torque transmission between the rotatable case and the rotatable shaft through the fluid, the outer plates having outer peripheries engageable with an inner peripheral surface of the rotatable case for rotation with the rotatable case, the inner plates having inner peripheries engageable with an outer peripheral surface of the rotatable shaft for rotation with the rotatable shaft, and members disposed between the inner peripheral surface of the rotatable case and the outer peripheries of the outer plates or between the outer peripheral surface of the rotatable shaft and the inner peripheries of the inner plates for holding the rotatable case and the rotatable shaft in engagement with each other while allowing them to be angularly shifted through a predetermined angle.

13 Claims, 3 Drawing Sheets

TORQUE TRANSMITTING DEVICE

BACKGROUND OF THE INVENTION

1. Field of the Invention:

The present invention relates to a torque transmitting device, and more particularly to a torque transmitting device of the viscous coupling type having a differential function through the utilization of fluid viscosity.

2. Description of Prior Art:

Recently, torque transmitting devices in the form of a viscous coupling for transmitting a torque through the viscosity of a fluid have been widely employed as automotive differentials.

For example, Japanese Laid-Open Patent Publication No. 58-50349 discloses a torque transmitting device comprising a cylindrical housing having a fluid chamber defined therein and filled with a fluid, a pair of coaxial shafts having confronting ends rotatably supported in the housing, a plurality of annular outer plates disposed in the fluid chamber for rotation with the housing, and a plurality of annular inner plates disposed in the housing alternately with the outer plates for rotation with the shafts.

The housing and the outer plates are coupled to each other by their respective inner teeth and outer teeth which are held in mesh with each other, and the shafts and the inner plates are also coupled to each other by their respective outer teeth and inner teeth which are held in mesh with each other. The torque transmitting device of this type is widely used to connect two coaxial shafts or as a differential between the rear road wheels of an automobile.

When the housing is rotated, the shafts are rotated at the same time by the viscosity of the fluid present between the outer plates and the inner plates.

If the shafts can be rotated with a certain positive time lag therebetween, then various advantages will be produced. Particularly, where the torque transmitting device is used as a differential between the rear road wheels of an automobile, if the shafts can be rotated with a certain time lag therebetween, a restoring moment produced on the automobile by a driving force acting on the inner road wheel and a braking force acting on the outer road wheel can be reduced, thus allowing the automobile to make turns with greater ease.

SUMMARY OF THE INVENTION

In view of the aforesaid requirement, it is an object of the present invention to provide a torque transmitting device capable of introducing a time lag in relative torque transmission between input and output shafts when they are differentially rotated.

According to the present invention, there is provided a torque transmitting device comprising a rotatable case having defined therein a fluid chamber extending axially and filled with a fluid, a rotatable shaft disposed coaxially in the fluid chamber and rotatable with respect to the case, a plurality of outer plates and inner plates disposed coaxially in the fluid chamber for relative torque transmission between the rotatable case and the rotatable shaft through the fluid, the outer plates having outer peripheries engageable with an inner peripheral surface of the rotatable case for rotation with the rotatable case, the inner plates having inner peripheries engageable with an outer peripheral surface of the rotatable shaft for rotation with the rotatable shaft, and engaging means disposed between the inner peripheral surface of the rotatable case and the outer peripheries of the outer plates or between the outer peripheral surface of the rotatable shaft and the inner peripheries of the inner plates for holding the rotatable case and the rotatable shaft in engagement with each other while allowing them to be angularly shifted through a predetermined angle.

The engaging means comprises at least a pair of engaged teeth disposed on the inner peripheral surface of the rotatable case and spaced circumferentially from each other, and at least one engaging tooth disposed on the outer periphery of each of the outer plates and projecting between the engaged teeth, the engaging tooth being engageable with the engaged teeth after having traversed a circumferential gap corresponding to the predetermined angle.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

The basic principles of a torque transmitting device according to the present invention will be described with reference to FIGS. 1 through 3.

Figure 1:
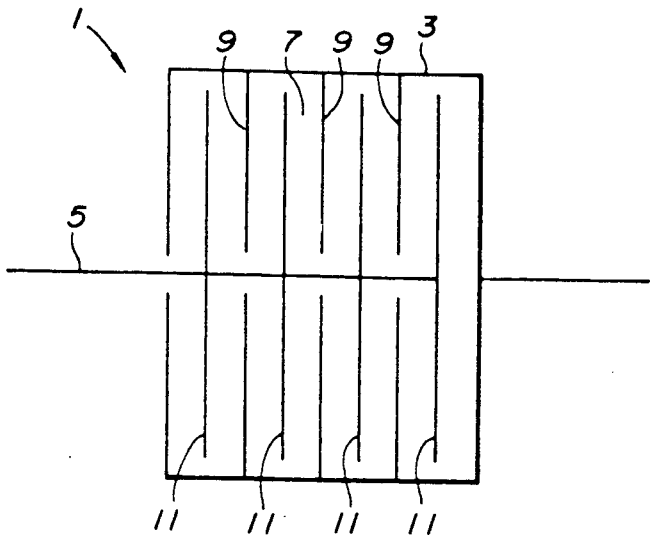
FIG. 1 is a schematic view showing the principles of a torque transmitting device according to the present invention.

As shown in FIG. 1, a torque transmitting device, generally designated at 1, comprises a case 3 having a fluid chamber 7 defined therein and filled with a viscous fluid, a shaft 5 rotatably disposed in the case 3, a plurality of outer plates 9 disposed in the fluid chamber 7 for rotation with the case 3, and a plurality of inner plates 11 disposed in the fluid chamber 7 alternation with the outer plates 9 for rotation with the shaft 5.

The inner periphery of the case 3 and the outer peripheries of the outer plates 9, and the outer periphery of the shaft 5 and the inner peripheries of the inner plates 11 are coupled at least in the direction in which they are rotated, by their inner peripheral engaged portions and outer peripheral engaging portions which are in mesh or engagement with each other.

Figure 2A:
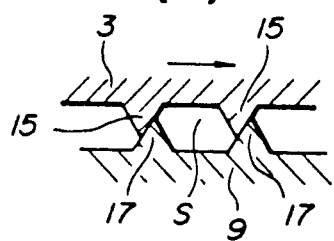
FIGS. 2(A), 2(B), and 2(C) are fragmentary cross-sectional views showing the manner in which inner and outer peripheral engaging members of an engaging means of the invention engage each other.
Figure 2B:
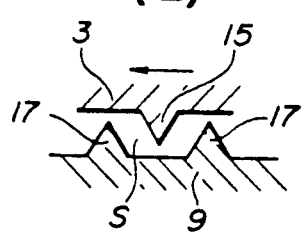
Figure 2C:
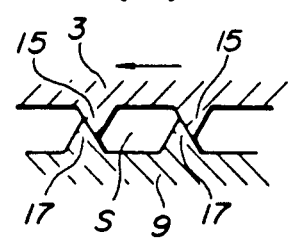
Figure 3:
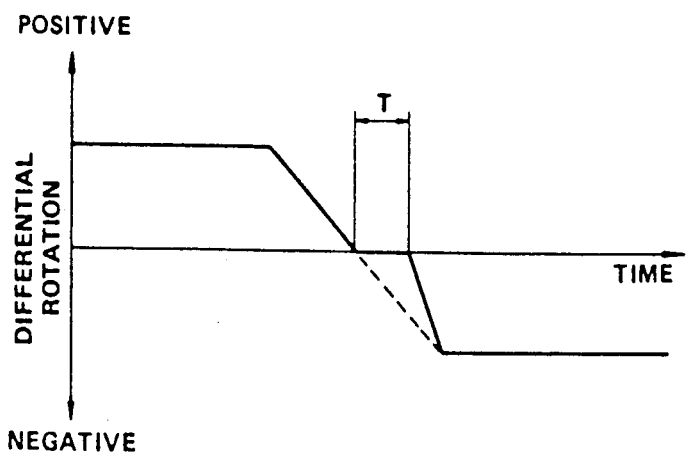
FIG. 3 is a graph showing the relationship between differential rotation and time.

Between the case 3 and the outer plates 9 (or alternating, and not shown between the shaft 5 and the inner plates 11), there is disposed an engaging means comprising, as shown in FIGS. 2(A) through 2(C), teeth 15 projecting radially inwardly from an inner peripheral surface of the case 3 and teeth 17 projecting radially outwardly from outer peripheral surfaces of the outer plates 9. The teeth 15, 17 are circumferentially spaced on the peripheral surfaces such that a gap or clearance S of a certain length will be defined circumferentially between two adjacent pairs of engaging teeth 15, 17.

As illustrated in FIG. 2(A), it is assumed that the case 3 is an input member and the shaft 5 an output member, and that the case 3 is positively rotated to cause the shaft 5 to rotate in one direction (indicated by the arrow in FIG. 2(A)) through engagement between the teeth 15, 17.

If the differential rotation between the case 3 and a shaft 5 while the shaft 5 is thus rotated by the case 3 as shown in FIG. 2(A) is defined as being "positive", then the case 3 tends to rotate the outer plates 9 in the same direction as long as the differential rotation remains positive.

If the differential rotation becomes zero and then "negative", then the case 3 rotates idly in space S with respect to the outer plates 9 in the direction of the arrow as shown in FIG. 2(B) until the teeth 15, 17 engage each other as shown in FIG. 2(C). This means that the case 3 and the outer plates 9 are relatively angularly shifted in the direction of their rotation through an angle corresponding to the gap S. Therefore, as illustrated in FIG. 3, a time lag T is produced in transmitting torque from the case 3 to the shaft 5 while the gap S is being traversed by the case 3, whereas no time lag would be generated as indicated by the dotted line if the gap S were not provided.

With the torque transmitting device of the invention, therefore, when the case 3 and the shaft 5 are differentially rotated during torque transmission therebetween, the case 3 and the outer plates 9 become engaged after a certain time lag.

A torque transmitting device according to a preferred embodiment of the present invention, especially for use as a differential between the rear road wheels of an automobile, based on the principles described above will be described below with reference to FIGS. 4 through 7.

Figure 4:
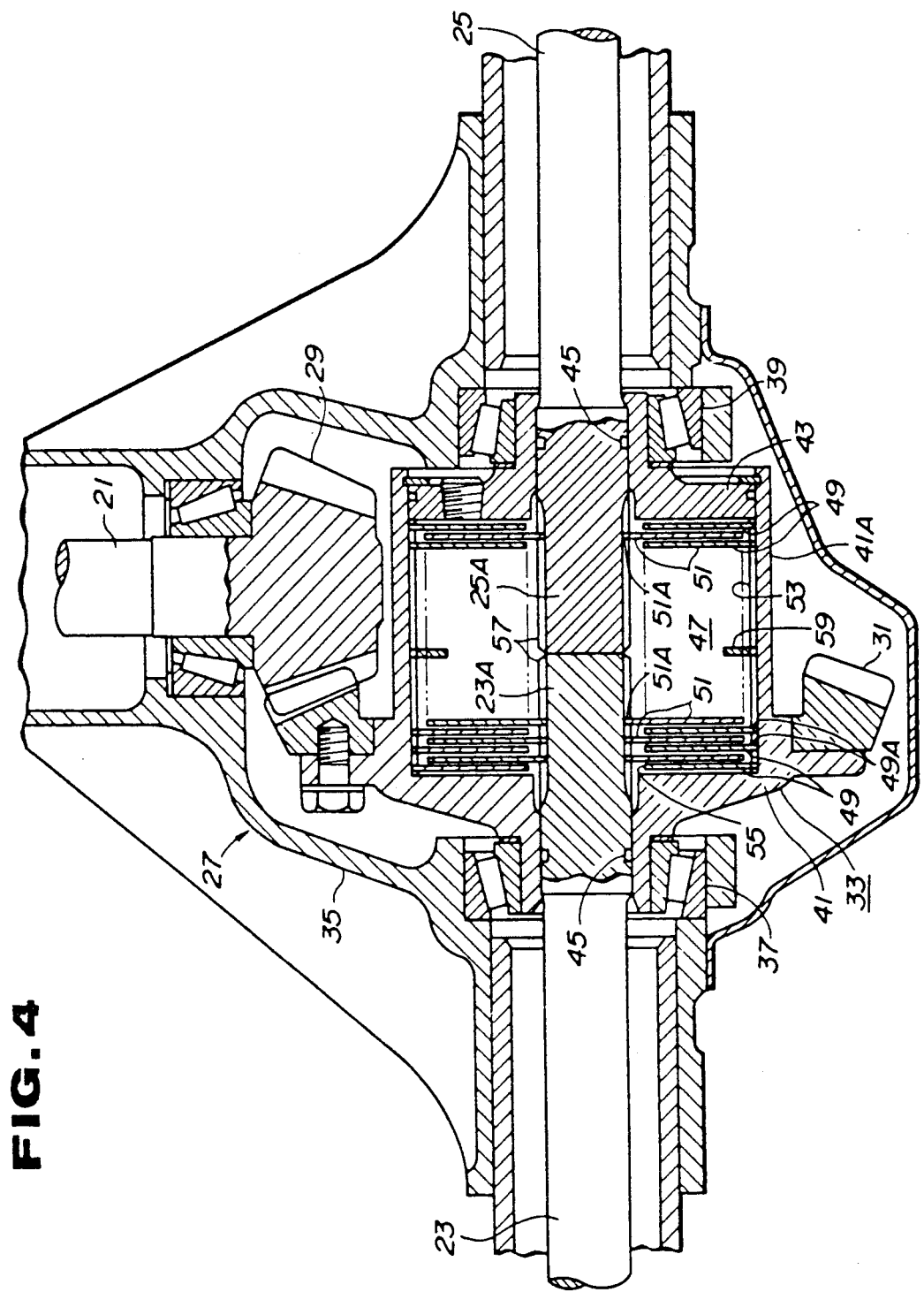
FIG. 4 is an axial cross-sectional view of a torque transmitting device according to an embodiment of the present invention.

FIG. 4 shows, in axial cross section, a torque transmitting device 27 according to a preferred embodiment of the invention.

To the torque transmitting device 27, there are coupled a propeller shaft 21 extending longitudinally of the automobile and right and left axle shafts 23, 25 extending coaxilly transversely of the automobile.

The torque transmitting device 27 includes a rotatable case 33 having a bevel gear 31 secured to its outer periphery and held in mesh with a bevel gear 29 mounted on the rear end of the propeller shaft 21. The case 33 is rotatably supported by bearings 37, 39 in a carrier 35 fixed to an automobile frame (not shown).

The case 33 comprises a case body 41 having a hollow barrel 41A and a cover 43 fitted in the hollow barrel 41A closing the open end of the barrel 41A. The axle shafts 23, 25 have inner confronting end portions 23A, 25A, respectively, fitted in the case 33 coaxially therewith, with seal members 45 interposed therebetween. The ends of the shaft end portions 23A, 25A are slidably held against each other at the center of the case 33.

The case 33 has a fluid chamber 47 defined therein by the hollow barrel 41A and the cover 43. The fluid chamber 47 extends coaxially with the axis of rotation of the case 33, and should preferably be a cylindrical fluid chamber extending coaxially with the axis of rotation of the case 33. The shaft end portions 23A, 25A are coaxially disposed in the fluid chamber 47 with their confronting ends slidably abutting against each other. The fluid chamber 47 accommodates therein a plurality of outer plates 49 and a plurality of inner plates 51 alternating with the outer plates 49, and the chamber is filed with a highly viscous fluid such as silicone oil or the like.

The outer plates 49 are preferably in the form of annular discs and have engaging members 49A on their outer peripheries which engage corresponding engaged members 53 on the inner peripheral surface of the case barrel 41A. The outer plates 49 have central holes 55 through which the end portions 23A, 25A of the axle shafts 23, 25 extend with clearance.

The inner plates 51 are preferably in the form of annular discs and have engaging members 51A on their inner peripheries which engage corresponding engaged members 57 on the outer peripheral surfaces of the shaft end portions 23A, 25A. The inner plates 51 have their outer peripheries spaced from the inner peripheral surface of the case barrel 41A.

A snap ring 59 disposed in the fluid chamber 47 is held in mesh with the engaged members 53 on the inner surface of the case barrel 41A in an axial position corresponding to the abutting end surfaces of the axle shaft end portions 23A, 25A. Preferably, the snap ring 59 has an outer profile which cooperates with the engaged members 53 on the inner peripheral surface of the case barrel 41A in defining passage windows for passage therethrough of the filled fluid across the snap ring 59.

Figure 5:
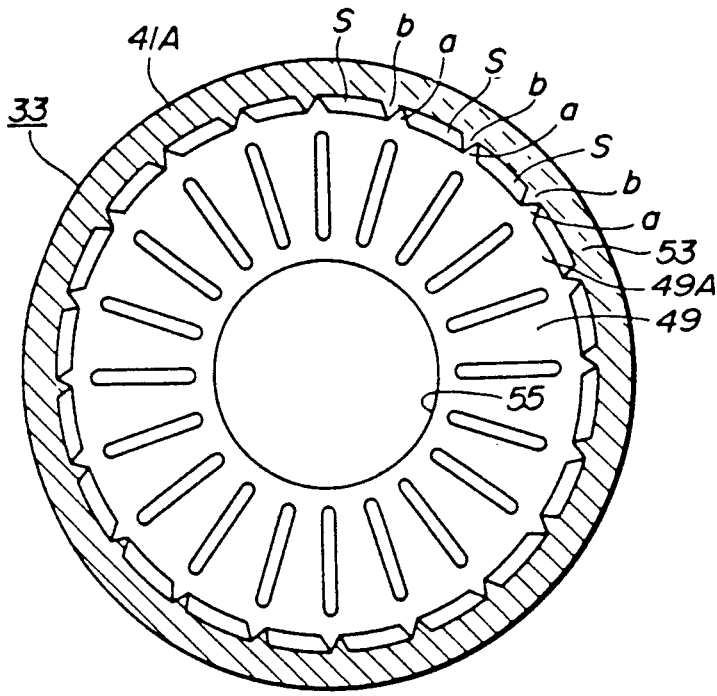
FIG. 5 is a cross-sectional view showing a case barrel and an outer plate.

In this embodiment, the engaging members 51A on the inner peripheries of the inner plates 51 and the engaged members 57 on the shaft end portions 23A, 25A are in the form of interfitting splines so that they mesh with each other at all times in the direction of rotation to allow the inner plates 51 and the shaft end portions 23A, 25A to rotate with each other. The engaging members 49A on the outer peripheries of the outer plates 49 and the engaged portions 53 on the inner peripheral surface of the case barrel 41A comprise, as shown in FIG. 5, a number of engaging teeth a and a number of engaged teeth b, respectively, which project radially outwardly and inwardly, respectively, for engagement with each other. The engaging and engaged teeth a, b are circumferentially spaced at equal intervals such that when the engaging teeth a and the engaged teeth b engage each other, certain gaps S are defined between adjacent pairs of teeth a, b. Therefore, when the engaging and engaged teeth a, b engage each other in pairs, the gaps S are present between the engaging pairs of teeth a, b, as shown in FIG. 5.

The engaging members 49A on the outer peripheries of the outer plates 49 and the engaged members 53 on the inner peripheral surface of the case barrel 41A are employed as an engaging means in this embodiment. However, an engaging means according to the present invention is not limited to the engaging members 49A and the engaged members 53 shown in FIG. 5, but may comprise at least a pair of engaged teeth disposed on the inner peripheral surface of the case barrel 41A and spaced a certain gap or distance from each other in the circumferential direction, and at least one engaging tooth disposed on the outer periphery of each of the outer plates 49 and projecting radially outwardly into a position between the engaged teeth, the engaging tooth being circumferentially spaced from the engaged teeth by a distance corresponding to the gap S. Thus, the engaging means of the present embodiment has the gaps S at all times.

Operation of the torque transmitting device will be described below.

When the automobile starts to make a turn, the torque transmitting device of the invention acts to limit differential movement between outer and inner road wheels, as with the general viscous coupling, such that the outer road wheel is subjected to a braking force since the peripheral speed of the tire is lower than the speed of the automobile on the road, whereas the inner road wheel is subjected to a driving force.

Thus, the tire of the outer road wheel tends to be rotated by the road surface. Assuming that the axle shaft 25 is coupled to the outer road wheel, and that the differential rotation between the case 33 and the axle shaft 25 is "positive" when the automobile runs straight, the differential rotation becomes "negative" when the automobile makes such a turn.

With the torque transmitting device 27 of the embodiment, while the differential rotation is positive, the engaging teeth a and the engaged teeth b shown in FIG. 5 are held in engagement with each other with the gaps S left between the engaging pairs. When the differential rotation becomes negative, the engaging teeth a are circumferentially shifted toward the adjacent engaged teeth b while traversing the gaps S. During the time in which the engaging teeth a are being shifted through the gaps S, the outer road wheel is released from the constraint imposed by torque transmission from the case 33. The braking force acting on the outer road wheel is thus generated with a time lag T corresponding to the time in which the outer road wheel is released.

Therefore, any restoring moment on the automobile when it starts to make a turn is reduced, allowing the automobile to make a turn with greater ease.

Figure 6:
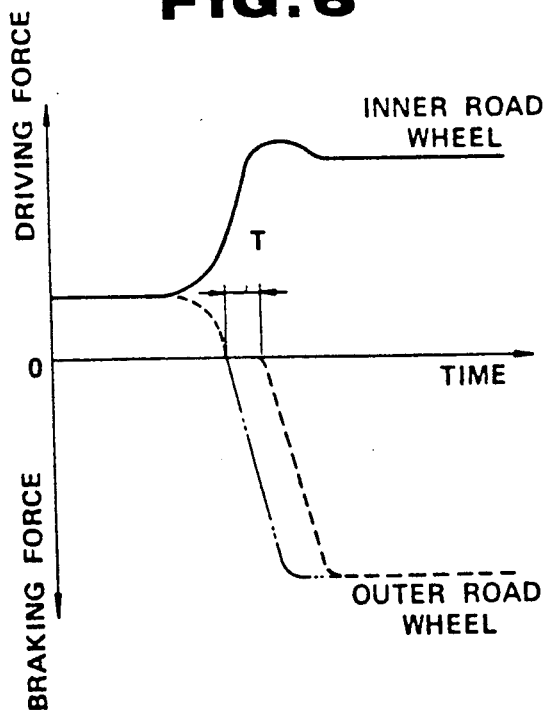
FIG. 6 is a graph showing the relationship, plotted against time, between driving and braking forces acting on inner and outer rear road wheels of a vehicle when the vehicle makes a turn.

FIG. 6 shows the relationship between the driving force acting on the inner road wheel and the braking force acting on the outer road wheel.

The torque transmitting device 27 permits the braking force to be produced with a time lag T commensurate with the gap S as indicated by the dotted line in FIG. 6, whereas no such time lag would be produced by a conventional torque transmitting device employing an engaging means with no gap S, as indicated by the two-dot-and-dash line.

When the automobile is steered to make a full turn, the difference between the speeds of rotation of the case 33 and the inner road wheel is the largest, and no substantial difference is caused between the speeds of rotation of the case 33 and the outer road wheel.

Therefore, a torque transmitting device having no axial fluid flow passage in its fluid chamber or a torque transmitting device with two transversely separate fluid chambers would cause strong tight-corner braking as the fluid would not be allowed to flow axially.

According to the illustrated embodiment, the engaging means comprising the engaging members 49A on the outer peripheries of the outer plates 59 and the engaged members 53 on the inner peripheral surface of the case barrel 41A have the gaps S which allow the fluid to flow axially therethrough. Consequently, the fluid flows from a higher pressure region in the fluid chamber 47, on the side of the inner road wheel, to a lower pressure region in the fluid chamber 47, on the side of the outer road wheel, thus lowering the fluid filling ratio in the region in the fluid chamber 47 on the side of the inner road wheel and weakening tight-corner braking.

Figure 7:
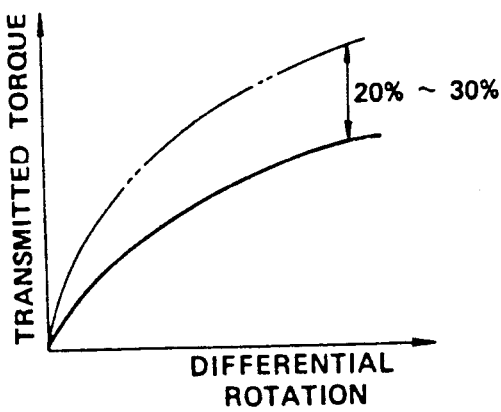
FIG. 7 is a graph illustrating the relationship between differential rotation and transmitted torque.

FIG. 7 shows the relationship between the differential rotation and the transmitted torque. As indicated by the solid line in FIG. 7, with the torque transmitting device 27 is possible to make the transmitted torque 20~30% lower than the torque (indicated by the dotted line) transmitted by a torque transmitting device having no axial fluid flow passage. Therefore, the phenomenon of tight-corner braking can be lessened by a degree corresponding to the torque reduction. The total area of the gaps S in the radial direction or in the plane of each outer plate 49 should preferably be 2~10% of the surface area of the outer plate 49.

Inasmuch as the fluid can flow axially through the gaps S, the fluid and air can be uniformly distributed in the fluid chamber 47 in the longitudinal direction of the axle shafts 23, 25, so that the torque characteristics of the axle shafts 23, 25 can be made uniform when the automobile is running straight.

Where the torque transmitting device of the invention is incorporated in a four-wheel-drive vehicle, vibration producing relative movements which is caused when the torques of drive systems for the front and rear wheels are varied can be absorbed by the gaps S, and hence vibratory noise can be reduced. In this case, the engaging means with the gaps S which comprises the engaging members 49A and the engaged members 53 as illustrated is advantageous from the standpoint of durability.

In the illustrated embodiment, the engaging means with the gaps S comprises the engaging members 49A on the outer peripheries of the outer plates 49 and the engaged members 53 on the inner peripheral surface of the case barrel 41A. However, the engaging members 51A on the inner peripheries of the inner plates 51 and the engaged members 57 on the outer peripheral surfaces of the axle shaft end portions 23A, 25A may constitute an engaging means having gaps S.

If the engaging means with the gaps S are provided between the outer peripheries of all of the outer plates 49 and the inner peripheral surface of the case barrel 41A or between the inner peripheries of all of the inner plates 51 and the outer peripheral surfaces of the axle shaft end portions 23A, 25A, noise may be produced due to the gaps S when a large torque variation is caused as by abruptly depressing the accelerator pedal. To avoid this problem, the number of plates having gaps S may be adjusted as by including several outer plates 49 which meshingly engage the inner peripheral surface of the case barrel 41A without such engaging means or including several similar inner plates 51. The engaging means with the gaps S may only be provided on the outer peripheries of the outer plates 49 or the inner peripheries of the inner plates 51 disposed in a central region of the case 33 for better axial fluid flowability.

While the present invention is applied to the rear wheel differential in the illustrated embodiment, the principles of the invention are also applicable to a differential lock device or a front wheel differential. The present invention is further applicable to a device for connecting two coaxial shafts.

The case and the shafts of the torque transmitting device are not limited to the illustrated structures, but may be of any desired construction. For example, the shafts disposed in the case, which are shown as being solid, may comprise hollow sleeves of annular cross section, and the torque transmitting members may be coupled in the hollow sleeves.

With the present invention, as described above, the torque transmitting device can produce a time delay in transmitting a torque between the case and the shafts. The engaging means comprises at least a pair of engaged teeth disposed on the inner peripheral surface of the case barrel 41A and spaced a certain gap or distance from each other in the circumferential direction, and at least one engaging tooth disposed on the outer periphery of each of the outer plates 49 and projecting radially outwardly into a position between the engaged teeth, the engaging tooth being circumferentially spaced from the engaged teeth by a distance corresponding to the gap S. Since the engaging means has the gaps S at all times, it allows the fluid to flow through the gaps S in the fluid chamber. The torque transmitting device of the invention is not limited to the above arrangement, but may employ any coupling means, instead of the engaging means as defined above, for coupling the case and the outer plates or the axle shafts and the inner plates while allowing a time lag to be incorporated in transmitting a torque through the fluid when the case 33 and the axle shaft 23 or 35 are differentially rotated.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is determined by the appended claims rather than by the foregoing description.

What is claimed is:

1. A torque transmitting device of viscous coupling type comprising a rotatable case member having defined therein a fluid chamber extending axially and filled with a viscous fluid, a rotatable shaft member disposed coaxially in said fluid chamber and rotatable with respect to said case member, two plate-groups comprised of outer plates and inner plates disposed coaxially in said fluid chamber, said outer plates being rotatable with said rotatable case member and said inner plates being rotatable with said rotatable shaft member for relative torque transmission between said rotatable case member and said rotatable shaft member through said fluid, and engaging means engaging the plates of at least one group of said two plate-groups with a peripheral surface of the corresponding rotatable member to provide rotational engagement therewith while allowing relative displacement therebetween through a predetermined angle, said engaging means comprising at least one pair of engaged teeth disposed on an inner peripheral surface of said rotatable case member spaced circumferentially from each other, and at least one engaging tooth disposed on an outer periphery of at least one of said outer plates projecting between said engaged teeth, said engaging tooth being engageable with said engaged teeth after having traversed a circumferential gap corresponding to said predetermined angle, said gap in a plane of said at least one outer plate having an area which is about 2 through 10% of the surface area of each said outer plate.

2. A torque transmitting device according to claim 1, wherein said at least one engaging tooth is disposed on the outer peripheries of selected outer plates.

3. A torque transmitting device according to claim 1, wherein said circumferential gap forms a flow passage for axial flow of the viscous fluid in said chamber.

4. A torque transmitting device according to claim 3, wherein said engaging tooth projects radially outwards from the peripheral surface of said one plate and said engaged teeth project radially inwards from the peripheral surface of said rotatable member.

5. A torque transmitting device of viscous coupling type comprising a rotatable case member having defined therein a fluid chamber extending axially and filled with a viscous fluid, a rotatable shaft member including two coaxial shafts disposed coaxially in said fluid chamber and rotatable with respect to said case member, and two plate-groups comprised of outer plates and inner plates disposed coaxially in said fluid chamber, said outer plates being rotatable with said rotatable case member and said inner plates being rotatable with said rotatable shaft member for relative torque transmission between said rotatable case member and said rotatable shaft member through said fluid, and engaging means engaging the plates of at least one group of said two plate-groups with a peripheral surface of the corresponding rotatable member to provide rotational engagement therewith while allowing relative angular displacement therebetween through a predetermined angle.

6. A torque transmitting device according to claim 5, wherein said engaging means comprises at least a pair of engaged teeth disposed on an inner peripheral surface of said rotatable case member and spaced circumferentially from each other, and at least one engaging tooth disposed on an outer periphery of at least one of said outer plates and projecting between said engaged teeth, said engaging tooth being engageable with said engaged teeth after having traversed a circumferential gap corresponding to said predetermined angle.

7. A torque transmitting device according to claim 6 wherein said at least one engaging tooth is disposed on the outer peripheries of selected outer plates.

8. A torque transmitting device according to claim 6 said engaging means comprises a pair of circumferentially spaced radial projecting teeth on at least one rotatable member and a radial tooth on one associated plate, said tooth being engaged between the spaced teeth on said rotatable member, said spaced teeth defining a circumferential gap which forms a flow passage for axial flow of the viscous fluid in said chamber.

9. A torque transmitting device according to claim 8 said tooth projects radially outwards from the respective peripheral surface of said plate and said teeth project radially inwards from the peripheral surface of said rotatable member.

10. A torque transmitting device according to claim 6 wherein said gap in a plane of said at least one outer plate has an area which is about 2 through 10% of the surface area of each said outer plate.

11. A torque transmitting device of viscous coupling type comprising a first rotatable member having a fluid chamber therein which is filled with a viscous fluid, a second rotatable member disposed in said fluid chamber and rotatable with respect to said first rotatable member, first and second plates disposed coaxially in said fluid chamber, said first and second plates being rotatable with said first and second rotatable members, respectively, for relative torque transmission between said first and second rotatable members and coupling means disposed between at least one of said rotatable members and said plates which are rotatable therewith for coupling and rotating said one rotatable member and said plates with each other after a predetermined time lag and relative angular movement therebetween upon relative torque transmission through said fluid when said first and second rotatable members are differentially rotated, said coupling means comprising at least one pair of engaged teeth projecting radially from said one rotatable member in circumferentially spaced relation and at least one engaging tooth projecting radially from at least one of said plates associated with said one rotatable member, said engaging tooth projecting between said engaged teeth and being selectively engageable therewith by traversing the circumferential space therebetween upon relative angular travel of said one rotatable member and said one plate during said time lag, said circumferential space defining a flow passage for axial flow of the viscous fluid in said chamber, said circumferential space in a plane of said one plate having an area which is about 2 to 10% of the surface area of said one plate.

12. A differential torque transmitting device according to claim 11, wherein said coupling means comprises at least a pair of engaged teeth disposed on an inner periphery of said first rotatable member and spaced circumferentially from each other, and at least one engaging tooth disposed on an outer periphery of at least one of said first plates and projecting between said engaged teeth, said engaging tooth being engageable with said engaged teeth after having traversed a circumferential gap corresponding to said predetermined time lag.

13. A differential torque transmitting device as claimed in claim 11 wherein said second rotatable member comprises two axle shafts in axial alignment and said first rotatable member comprises a case member surrounding said axle shafts.

* * * * *